(12) United States Patent
Wang et al.

(10) Patent No.: US 10,901,429 B2
(45) Date of Patent: Jan. 26, 2021

(54) METHOD AND APPARATUS FOR OUTPUTTING INFORMATION OF AUTONOMOUS VEHICLE

(71) Applicant: Baidu Online Network Technology (Beijing) Co., Ltd., Beijing (CN)

(72) Inventors: Bosheng Wang, Beijing (CN); Jun Wang, Beijing (CN); Liang Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 190 days.

(21) Appl. No.: 16/134,724

(22) Filed: Sep. 18, 2018

(65) Prior Publication Data

US 2019/0171212 A1 Jun. 6, 2019

(30) Foreign Application Priority Data

Nov. 24, 2017 (CN) .......................... 2017 1 1195021

(51) Int. Cl.
G05D 1/02 (2020.01)
G05D 1/00 (2006.01)
(Continued)

(52) U.S. Cl.
CPC .............. *G05D 1/024* (2013.01); *G01S 17/86* (2020.01); *G01S 17/89* (2013.01); *G01S 17/931* (2020.01);
(Continued)

(58) Field of Classification Search
CPC ......... G05D 2201/0213; G05D 1/0088; G05D 1/024; G05D 1/0246; G05D 1/0274;
(Continued)

(56) References Cited

U.S. PATENT DOCUMENTS 8,996,224 B1 * 3/2015 Herbach .............. G05D 1/0044
701/23
9,008,890 B1 * 4/2015 Herbach .............. G05D 1/0214
701/26
(Continued)

FOREIGN PATENT DOCUMENTS

CN 104919471 A 9/2015

OTHER PUBLICATIONS

Apollo: HDMap ROI Filter; Based on Convolutional Neural Network Segmentation (CNN Segmentation); MinBox obstacle frame construction (MinBox Builder); and HM Object Tracker, URL= https://zhuanlan.zhihu.com/p/30311165, published Oct. 20, 2017.
(Continued)

*Primary Examiner* — Atul Trivedi
(74) *Attorney, Agent, or Firm* — Seed IP Group LLP (57) ABSTRACT

A method and apparatus for outputting information of an autonomous vehicle are provided. The autonomous vehicle comprises a lidar. A specific embodiment of the method comprises: determining a target area around the autonomous vehicle from a target map based on positioning information of the autonomous vehicle; acquiring obstacle point cloud data in a preset area around the autonomous vehicle by the lidar, the preset area including the target area; determining a point cloud data set corresponding to the target area from the point cloud data of the obstacle based on the target area and the point cloud data, and determining the point cloud data set as a target point cloud data set; and outputting the target point cloud data set. The embodiment has reduced the usage rate of vehicle terminal processors, and improved the driving safety of the vehicle.

11 Claims, 4 Drawing Sheets

(51) Int. Cl.
*G06T 7/73* (2017.01)
*G01S 17/89* (2020.01)
*G01S 17/86* (2020.01)
*G01S 17/931* (2020.01)

(52) U.S. Cl.
CPC ............. *G05D 1/0088* (2013.01); *G06T 7/74* (2017.01); *G05D 2201/0213* (2013.01); *G06T 2207/10028* (2013.01); *G06T 2207/30261* (2013.01)

(58) Field of Classification Search
CPC ........ G01S 17/86; G01S 17/89; G01S 17/931; G06K 9/00805; G06T 2207/10028; G06T 2207/30261; G06T 7/74
USPC .......................................................... 701/23
See application file for complete search history.

(56) References Cited

U.S. PATENT DOCUMENTS

| | | | | |
|---|---|---|---|---|
| 9,164,511 | B1* | 10/2015 | Ferguson | G01S 13/02 |
| 9,738,278 | B2* | 8/2017 | Hasberg | G05D 1/0274 |
| 9,766,628 | B1* | 9/2017 | Lo | G06K 9/4661 |
| 2014/0293263 | A1* | 10/2014 | Justice | G01S 17/42 356/4.01 |
| 2015/0131080 | A1* | 5/2015 | Retterath | G01S 17/93 356/5.01 |
| 2015/0353083 | A1* | 12/2015 | Hasberg | G06T 11/203 701/1 |
| 2015/0370251 | A1* | 12/2015 | Siegel | B64D 1/22 701/2 |
| 2016/0209846 | A1* | 7/2016 | Eustice | G06T 7/75 |
| 2016/0221592 | A1* | 8/2016 | Puttagunta | B61L 25/04 |
| 2016/0227193 | A1* | 8/2016 | Osterwood | G01S 17/42 |
| 2016/0334230 | A1* | 11/2016 | Ross | G01C 21/3415 |
| 2017/0123422 | A1* | 5/2017 | Kentley | B60L 15/20 |
| 2017/0126810 | A1* | 5/2017 | Kentley | G06Q 50/30 |
| 2017/0132934 | A1* | 5/2017 | Kentley | G08G 1/202 |
| 2017/0136631 | A1* | 5/2017 | Li | B25J 19/005 |
| 2017/0215086 | A1* | 7/2017 | Priest | H04N 7/185 |
| 2017/0227647 | A1* | 8/2017 | Baik | G01S 17/06 |
| 2017/0248969 | A1* | 8/2017 | Ham | G08G 5/0021 |
| 2017/0300059 | A1* | 10/2017 | Rust | G01S 7/003 |
| 2018/0188372 | A1* | 7/2018 | Wheeler | G01C 21/32 |
| 2018/0189578 | A1* | 7/2018 | Yang | G05D 1/0088 |
| 2018/0190016 | A1* | 7/2018 | Yang | G06T 17/05 |
| 2018/0225968 | A1* | 8/2018 | Wang | G01S 19/45 |
| 2018/0253107 | A1* | 9/2018 | Heinla | G05D 1/0212 |
| 2019/0120948 | A1* | 4/2019 | Yang | G01S 17/931 |
| 2019/0129039 | A1* | 5/2019 | Schubert | G01S 17/933 |
| 2019/0138823 | A1* | 5/2019 | Doria | G06T 7/521 |
| 2019/0230850 | A1* | 8/2019 | Johnson | G05D 1/0088 |
| 2019/0243371 | A1* | 8/2019 | Nister | G05D 1/0231 |
| 2019/0271559 | A1* | 9/2019 | Colgate | G01C 21/28 |
| 2019/0272389 | A1* | 9/2019 | Viente | H04W 4/44 |
| 2019/0361439 | A1* | 11/2019 | Zeng | G06K 9/00791 |
| 2019/0361454 | A1* | 11/2019 | Zeng | B60W 50/0098 |
| 2019/0361456 | A1* | 11/2019 | Zeng | G01C 21/20 |
| 2019/0383945 | A1* | 12/2019 | Wang | G01S 7/4808 |
| 2020/0132850 | A1* | 4/2020 | Crouch | G01S 17/32 |

OTHER PUBLICATIONS

任洪海 肖刚强, *Computer graphics theory and algorithms base (institutions of higher learning. second five planning materials Digital Media Technology)*(Chinese Edition), 2012, pp. 32-35 and abstract.

* cited by examiner

METHOD AND APPARATUS FOR OUTPUTTING INFORMATION OF AUTONOMOUS VEHICLE

CROSS-REFERENCE TO RELATED APPLICATIONS

This application claims priority to Chinese Patent Application No. 201711195021.3, filed on Nov. 24, 2017, titled "Method and Apparatus for Outputting Information of Autonomous Vehicle," which is hereby incorporated by reference in its entirety.

TECHNICAL FIELD

Embodiments of the disclosure relate to the field of computer technology, specifically to the field of autonomous driving technology, and more specifically to a method and an apparatus for outputting information of an autonomous vehicle.

BACKGROUND

In the autonomous driving system, the obstacle sensing system needs to detect, classify, and track obstacles around the autonomous vehicle according to various kinds of sensor data. The coverage areas of different sensors are generally different, e.g., a 64-beam lidar well covers the surrounding area within a radius of 60 m. The decision planning and control system mainly pays attention to areas where obstacles likely affect the driving of the autonomous vehicle. Therefore, detecting obstacles in the perceived region of interest of the autonomous vehicle has an important significance for safe driving of the autonomous vehicle.

SUMMARY

Embodiments of the disclosure present a method and an apparatus for outputting information of an autonomous vehicle.

In a first aspect, an embodiment of the disclosure provides a method for outputting information of an autonomous vehicle. The autonomous vehicle includes a lidar. The method includes: determining a target area around the autonomous vehicle from a target map based on positioning information of the autonomous vehicle; acquiring point cloud data of an obstacle in a preset area around the autonomous vehicle by the lidar, the preset area including the target area; determining a point cloud data set corresponding to the target area from the point cloud data of the obstacle based on the target area and the point cloud data, and determining the point cloud data set as a target point cloud data set; and outputting the target point cloud data set.

In some embodiments, the target area is a 2D polygon in a world coordinate system; and after the acquiring point cloud data of an obstacle around the autonomous vehicle, the method further includes: converting the point cloud data from a local coordinate system into the world coordinate system, where the local coordinate system is a coordinate system with a midpoint of the lidar as an origin of coordinates.

In some embodiments, the determining a point cloud data set corresponding to the target area from the point cloud data of the obstacle includes: filling the target area in an image of the preset area using a polygon scan line filling algorithm; and determining a position corresponding to the point cloud data of the obstacle in the preset area, determining point cloud data corresponding to a filled position as point cloud data corresponding to the target area, and generating the point cloud data set.

In some embodiments, the determining a point cloud data set corresponding to the target area from the point cloud data of the obstacle includes: dividing the image of the preset area into a grid graph according to a preset grid size; generating a bitmap of the grid graph, where each grid cell in the grid graph corresponds to one bit in the bitmap, and a numeral value at each bit of the bitmap is a preset first numeral value; determining a to-be-filled area for the target area in the grid graph using the polygon scan line filling algorithm, and modifying a numeral value at a bit corresponding to a grid cell in the to-be-filled area to a second preset numeral value; and determining a grid cell corresponding to the point cloud data of the obstacle in the grid graph, selecting a grid cell corresponding to a bit having the second preset numeral value from the determined grid cell, and determining point cloud data corresponding to the selected grid cell as point cloud data corresponding to the target area.

In some embodiments, the filling the target area in an image of the preset area using a polygon scan line filling algorithm includes: determining, for each vertex of a polygon formed by the target area, an intersection by: acquiring abscissa values and ordinate values of a first vertex and a second vertex in response to determining that a scan line $l_i$ n parallel with an abscissa axis scans the each vertex, where the first vertex and the second vertex are vertexes adjacent to the each vertex among vertexes of the polygon; determining a value of difference between an ordinate value of a vertex having a smaller abscissa value among the first vertex and the second vertex and an ordinate value of the each vertex as a first difference value; determining a value of difference between an ordinate value of a vertex having a greater abscissa value among the first vertex and the second vertex and an ordinate value of the each vertex as a second difference value; and determining a number of intersection points between the each vertex and the scan line as two in response to determining a product of the first difference value and the second difference value being greater than zero.

In a second aspect, an embodiment of the disclosure provides an apparatus for outputting information of an autonomous vehicle. The autonomous vehicle includes a lidar. The apparatus includes: a first determining unit, configured for determining a target area around the autonomous vehicle from a target map based on positioning information of the autonomous vehicle; an acquisition unit, configured for acquiring point cloud data of an obstacle in a preset area around the autonomous vehicle by the lidar, the preset area including the target area; a second determining unit, configured for determining a point cloud data set corresponding to the target area based on the target area and the point cloud data, and determining the point cloud data set as a target point cloud data set; and an output unit, configured for outputting the target point cloud data set.

In some embodiments, the target area is a 2D polygon in a world coordinate system; and the apparatus further includes: a conversion unit, configured for converting the point cloud data from a local coordinate system into the world coordinate system, where the local coordinate system is a coordinate system with a midpoint of the lidar as an origin of coordinates.

In some embodiments, the second determining unit includes: a filling module, configured for filling the target area in an image of the preset area using a polygon scan line filling algorithm; and a first generation module, configured for determining a position corresponding to the point cloud data of the obstacle in the preset area, determining point cloud data corresponding to a filled position as the point cloud data corresponding to the target area, and generating the point cloud data set.

In some embodiments, the second determining unit includes: a division module, configured for dividing the image of the preset area into a grid graph according to a preset grid size; a second generation module, configured for generating a bitmap of the grid graph, where each grid cell in the grid graph corresponds to one bit in the bitmap, and a numeral value at each bit of the bitmap is a preset first numeral value; a modification module, configured for determining a to-be-filled area for the target area in the grid graph using the polygon scan line filling algorithm, and modifying a numeral value at a bit corresponding to a grid cell in the to-be-filled area to a second preset numeral value; and a determining module, configured for determining a grid cell corresponding to the point cloud data of the obstacle in the grid graph, selecting a grid cell corresponding to a bit having the second preset numeral value from the determined grid cell, and determining point cloud data corresponding to the selected grid cell as the point cloud data corresponding to the target area.

In some embodiments, the filling module is further configured for: determining, for each vertex of a polygon formed by the target area, an intersection by: acquiring abscissa values and ordinate values of a first vertex and a second vertex in response to determining that a scan line $l_i$ n parallel with an abscissa axis scans the vertex, where the first vertex and the second vertex are vertexes adjacent to the scanned vertex among vertexes of the polygon; determining a value of difference between an ordinate value of a vertex having a smaller abscissa value among the first vertex and the second vertex and an ordinate value of the scanned vertex as a first difference value; determining a value of difference between an ordinate value of a vertex having a greater abscissa value among the first vertex and the second vertex and an ordinate value of the scanned vertex as a second difference value; and determining a number of intersection points between the scanned vertex and the scan line as two in response to determining a product of the first difference value and the second difference value being greater than zero.

In a third aspect, an embodiment of the disclosure provides an electronic device. The electronic device includes: one or more processors; and a memory for storing one or more programs, where the one or more programs, when executed by the one or more processors, cause the one or more processors to implement the method for outputting information of an autonomous vehicle according to the disclosure.

In a fourth aspect, an embodiment of the disclosure provides a computer readable storage medium storing a computer program, where the program implements, when executed by a processor, the method for outputting information of an autonomous vehicle according to the disclosure.

The method and apparatus for outputting information of an autonomous vehicle according to the embodiments of the disclosure determine a target area around the autonomous vehicle from a target map based on positioning information of the autonomous vehicle, then acquire obstacle point cloud data in a preset area around the autonomous vehicle by a lidar, then determine a point cloud data set corresponding to the target area from the point cloud data of the obstacle based on the target area and the point cloud data of the obstacle in the preset area, and finally output the point cloud data set corresponding to the target area, thereby outputting the point cloud data of the obstacle in the perceived region of interest of the autonomous vehicle, reducing the usage rate of vehicle terminal processors, and improving the driving safety of the vehicle.

BRIEF DESCRIPTION OF THE DRAWINGS

Other features, objectives and advantages of the present disclosure will become more apparent upon reading the detailed description to non-limiting embodiments with reference to the accompanying drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
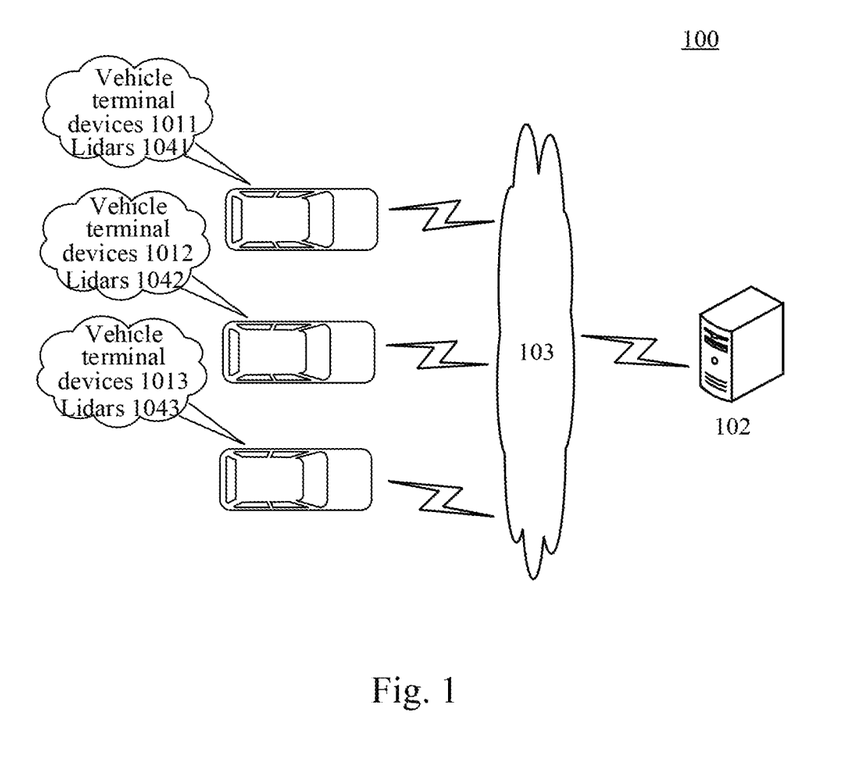
FIG. 1 an architectural diagram of an exemplary system in which the present disclosure may be implemented.

FIG. 1 shows an exemplary system architecture 100 in which a method for outputting information of an autonomous vehicle or an apparatus for outputting information of an autonomous vehicle according to an embodiment of the disclosure may be applied.

As shown in FIG. 1, the system architecture 100 may include vehicle terminal devices 1011, 1012, and 1013, a cloud server 102, a network 103, and lidars 1041, 1042, and 1043. The network 103 is used for providing a communication link medium between the vehicle terminal devices 1011, 1012, and 1013, and the cloud server 102. The network 103 may include a variety of connection types, such as a wireless communication link, a global positioning system, or a fiber cable.

The vehicle terminal devices 1011, 1012, and 1013 interact with the cloud server 102 through the network 103, to receive or send messages, etc. The vehicle terminal devices 1011, 1012, and 1013 may send an outputted target point cloud data set to the cloud server 102, to facilitate the cloud server 102 to update information regarding an obstacle on a motor vehicle lane.

The vehicle terminal devices 1011, 1012, and 1013 are vehicle terminal vehicles that may provide support for point cloud data of an obstacle within the target area and a preset area. The vehicle terminal devices may process, e.g., analyze, the determined target area, the acquired obstacle point cloud data, and the like, and output the processing result (e.g., a target point cloud data set).

It should be noted that the method for outputting information of an autonomous vehicle according to an embodiment of the disclosure is generally executed by the vehicle terminal devices 1011, 1012, and 1013. Accordingly, the apparatus for outputting information of an autonomous vehicle is generally arranged in the vehicle terminal devices 1011, 1012, and 1013.

It should be appreciated that the numbers of the vehicle terminal devices, the cloud servers, the networks, and the lidars in FIG. 1 are only illustrative. Any number of the vehicle terminal devices, the cloud servers, the networks, and the lidars may be provided based on implementation needs.

Figure 2:
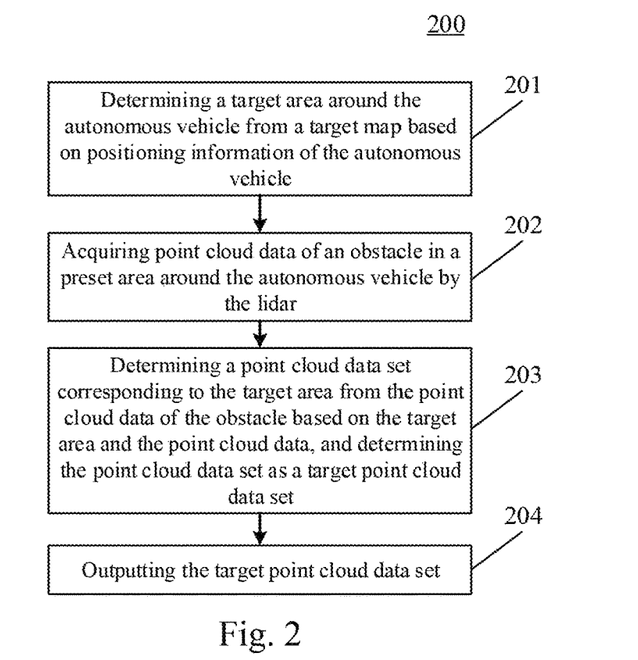
FIG. 2 is a flowchart of a method for outputting information of an autonomous vehicle according to an embodiment of the disclosure.

Reference is made to FIG. 2, which shows a flow 200 of a method for outputting information of an autonomous vehicle according to an embodiment of the disclosure. The method for outputting information of an autonomous vehicle includes steps 201 to 204.

Step 201 includes: determining a target area around the autonomous vehicle from a target map based on positioning information of the autonomous vehicle.

In the embodiment, an electronic device (e.g., the vehicle terminal device shown in FIG. 1) in which the method for outputting information of an autonomous vehicle is implemented may first acquire positioning information of the autonomous vehicle where the electronic device runs at a current moment. The positioning information is used for determining a position of the autonomous vehicle at the current moment. The positioning information may be position information expressed in the form of coordinates, for example, east longitude 116°23′ 17″. The above coordinates are a coordinate system including latitudes and longitudes, may also be referred to as a geographic coordinate system, are a spherical coordinate system defining the space on the earth using a 3D spherical surface, and can indicate any location on the earth. The electronic device may accurately determine a current location of the autonomous vehicle by comparing data of a Global Positioning System (GPS), an Inertial Measurement Unit (IMU), Light Detection and Ranging q(LIDAR) and a camera. Then the electronic device may find a positioning address indicated by the positioning information in the target map, to determine the target area around the autonomous vehicle. The target map may be a high precision electronic map stored in the electronic device. The high precision electronic map may contain a considerable amount of auxiliary vehicle driving information, such as a geometrical structure of road surface, a road mark location, and a point cloud model of surrounding road environment. The target area may be referred to as a region of interest (ROI) or a region of concern. The region of interest is an image region selected from an image, and the selected image region is a key region of concern in image analysis. In this case, the target area generally may refer to a road area having a preset length on a current road of the autonomous vehicle along a driving direction of the vehicle. For example, if the driving direction of the autonomous vehicle is forward driving, then the target area may be a road area within five meters in front of the autonomous vehicle.

Step 202 includes acquiring, by a lidar, point cloud data of an obstacle in a preset area around the autonomous vehicle.

In the embodiment, the autonomous vehicle may include the lidar, for example, a 64-beam lidar. The lidar is a radar system detecting characteristic parameters, such as a position and a speed, of a target by emitting laser beams. During driving the autonomous vehicle, the lidar may send a detection signal (a laser beam) to an obstacle within a preset range around the autonomous vehicle, and then obtain parameters, such as a distance, an azimuth, a height, a speed, and a shape, of the obstacle by comparing a received signal (a target echo) echoed from the obstacle with the detection signal, to generate the point cloud data of the obstacle. The point cloud data record 3D coordinates, color information or echo intensity information of each point of an object in the form of points. The electronic device may acquire the point cloud data of the obstacle in the preset area around the autonomous vehicle by the lidar. The preset area may be an area including the target area in the driving direction of the vehicle (for example, a square area of 20 m×20 m in front of the vehicle).

In the embodiment, when the target area is a 2D polygon in a coordinate system of the autonomous vehicle, where the coordinate system of the autonomous vehicle is a coordinate system with a midpoint of the autonomous vehicle as an origin of coordinates. After acquiring the point cloud data of the obstacle in the preset area, the electronic device needs to convert the point cloud data from a local coordinate system into the coordinate system of the autonomous vehicle, where the local coordinate system is a coordinate system with the midpoint of the lidar as the origin of coordinates. Both the local coordinate system and the coordinate system of the autonomous vehicle are spatial rectangular coordinate systems, and the coordinate conversion between different spatial rectangular coordinate systems is well-known knowledge that is widely researched and applied at present, and is not repeated any more here.

In some optional implementations of the embodiment, the target area may be a 2D polygon in the world coordinate system. The world coordinate system is a systematic absolute coordinate system, and respective positions of coordinates of points are generally determined based on the origin of the world coordinate system prior to establishing a user coordinate system. After acquiring the point cloud data of the obstacle in the preset area, the electronic device needs to convert the point cloud data from the local coordinate system into the world coordinate system, where the local coordinate system is a coordinate system with the midpoint of the lidar as the origin of coordinates. The coordinate conversion from the local coordinate system into the world coordinate system is well-known knowledge that is widely researched and applied at present, and is not repeated anymore here.

Step 203 includes: determining a point cloud data set corresponding to the target area from the point cloud data of the obstacle based on the target area and the point cloud data, and determining the point cloud data set as a target point cloud data set.

In the embodiment, based on the target area determined in the step 201 and the point cloud data of the obstacle in the preset area acquired in the step 202, the electronic device may determine the point cloud data set corresponding to the target area from the point cloud data of the obstacle, and may determine the point cloud data set as the target point cloud data set.

In the embodiment, if the target area is a 2D polygon in the coordinate system of the autonomous vehicle, and the point cloud data is 3D coordinates of points in the coordinate system of the autonomous vehicle, the electronic device may project points indicated by the point cloud data onto a plane of the 2D polygon formed by the target area, determine point cloud data corresponding to projection points within the target area among the projected points as the point cloud data set corresponding to the target area, and determine the point cloud data set as the target point cloud data set.

In some optional implementations of the embodiment, the electronic device may fill the target area in an image of the preset area using a polygon scan line filling algorithm. The basic idea of the polygon scan line filling algorithm is: if the y axis direction in the coordinate system is set as a main direction, then the scan line $l_i$ s a straight line $l_i$ n parallel with the x axis, a polygon formed by a plurality of end-to-end line segments is scanned using scan lines from top to bottom (or from bottom to top), and each of the scan lines has a series of intersection points with sides of the polygon. These intersection points are numbered based on x coordinates, the numbered points are pairwise used as two endpoints of line segments, and horizontal lines are drawn with a filled color. On completion of scanning the polygon, the color filling is completed. Specifically, first, the electronic device may set the y axis direction in the coordinate system as the main direction, or determine the direction in which the polygon has a longer span from the x axis direction and the y axis direction as the main direction. Here, the way of selecting the main direction is not limited. To facilitate illustration, the y axis direction is set as the main direction, and the scanning direction of the scan lines is set as from bottom to top (from the minimum ordinate value to the maximum ordinate value). Then, the scan lines begin to scan the polygon formed by the target area. The intersection points between the scan lines and the polygon may be recorded during each scanning, and be numbered from left to right (from the minimum abscissa value to the maximum abscissa value). Then, an area between an odd-numbered intersection point and an even-numbered intersection point is determined as an inner area of the polygon. Finally, the position of the scan line $l_i$ s updated based on a constant scanning interval, until completing scanning the polygon (the ordinate value of the scan line reaches the maximum value). As an example, if there are four intersection points between one scan line and the polygon, then the four intersection points are numbered from left to right respectively as an intersection point 1, an intersection point 2, an intersection point 3, and an intersection point 4. An area between the intersection point 1 (odd-numbered intersection point) and the intersection point 2 (even-numbered intersection point) and an area between the intersection point 3 and the intersection point 4 may be determined as inner areas of the polygon.

In some optional implementations of the embodiment, the electronic device may further accelerate the polygon scan line filling process using an activated side list technology. When scan lines and sides of the polygon are processed to calculate intersections, because of the consistency of the sides, when a scan line $l_i$ intersects with a side of the polygon, an adjacent scan line $l_{i+1}$ of the scan line $l_i$ may also intersect with the side (unless the scan line $l_{i+1}$ goes beyond the interval of the side), and the intersection point between the scan line $l_{i+1}$ and the side may be calculated recursively from an intersection point between the last scan line $l_i$ and the side according to equation (1) below:

$$x_{i+1} = x_i + \frac{1}{k} \quad (1)$$

where $x_{i+1}$ is the intersection point between the scan line $l_{i+1}$ and the side, $x_i$ is the intersection point between the scan line $l_i$ and the side, k is a slope of the side, and i is a positive integer.

In this case, the side (a side intersecting with the scan line) is an activated side. Activated sides may be arranged in an ascending order of ordinate values each being the minimum ordinate value of each of the activated sides. The arranged activated sides are stored in a linked list, which may be referred to as an activated side list. For each activated side, in the process of scanning the polygon using the scan lines, when a new position is scanned each time, it is necessary to determine whether scanning the activated side is completed, and if the scanning is completed, then it is necessary to delete the activated side from the activated side list. It is further necessary to determine whether the scan line scans a new side. If the new side is scanned, the scanned new side is added to the activated side list, and the activated sides in the activated side list are re-arranged.

In some optional implementations of the embodiment, after filling the target area, the electronic device may determine that a position in the preset area corresponds to the point cloud data of the obstacle, determine point cloud data corresponding to a filled position as the point cloud data corresponding to the target area, and generate the point cloud data set. Specifically, the electronic device may set coordinate values characterizing height information in the point cloud data of the obstacle as a height value of the target area, to determine a projection of the obstacle on the preset area. Each of points indicated by the point cloud data corresponds to one position in the preset area, and one position may correspond to a plurality of points. Then the electronic device may determine point cloud data of the point corresponding to the filled position as the point cloud data corresponding to the target area, and generate the point cloud data set.

In some optional implementations of the embodiment, the electronic device generally needs to determine a number of intersection points between each vertex of the polygon and the scan lines. The electronic device may determine, for each vertex of the polygon formed by the target area, an intersection point as follows: first, the electronic device may acquire abscissa values and ordinate values of a first vertex and a second vertex in response to determining that a scan line in parallel with an abscissa axis scans the vertex, where the first vertex and the second vertex are vertexes adjacent to the scanned vertex among vertexes of the polygon, and a vertex adjacent to the scanned vertex is a vertex sharing a side with the scanned vertex, i.e., the scanned vertex and the vertex adjacent thereto are two endpoints of a side of the polygon; then may determine a value of difference between an ordinate value of an endpoint (left endpoint) having a smaller abscissa value among the first vertex and the second vertex and an ordinate value of the scanned vertex as a first difference value; then may determine a value of difference between an ordinate value of an endpoint (right endpoint) having a greater abscissa value among the first vertex and the second vertex and an ordinate value of the scanned vertex as a second difference value; and finally determine whether a product of the first difference value and the second difference value is greater than zero, and determine the number of intersection points between the scanned vertex and the scan line as two if the product of the first difference value and the second difference value is greater than zero.

Here, in response to determining the product of the first difference value and the second difference value being equal to zero, it may be determined that there is a horizontal side (a side in parallel with the abscissa axis) among the sides connected with the vertex. In this case, the number of an intersection point between the vertex and the scan line may be determined at least by:

determining the number of the intersection point between the vertex and the scan line as one, in response to determining one of the first difference value or the second difference value being equal to zero, while the other difference value being greater than zero; and determining the number of the intersection point between the vertex and the scan line as zero, in response to determining one of the first difference value or the second difference value being equal to zero, while the other difference value being smaller than zero; and determining the number of the intersection point between the vertex and the scan line as two, in response to determining the product of the first difference value and the second difference value being equal to zero.

After determining the number of the intersection point between the vertex and the scan line by the above method, the inner area of the polygon may be further determined and filled. A horizontal side connected with the vertex may be determined as the inner area of the polygon, or the outer area of the polygon. In this case, the horizontal side may belong to the inner area or the outer area of the polygon based on the actual situation, to ensure more accurately determining the target area of the autonomous vehicle (region of interest).

Step 204 includes: outputting the target point cloud data set.

In the embodiment, the electronic device may output the target point cloud data set determined in the step 203. The electronic device may output the target point cloud data set into the cloud server in communication link with the electronic device; and analyze the target point cloud data set, generate a 3D image characterizing the obstacle in the target area, and present the 3D image on a display of the autonomous vehicle.

Figure 3:
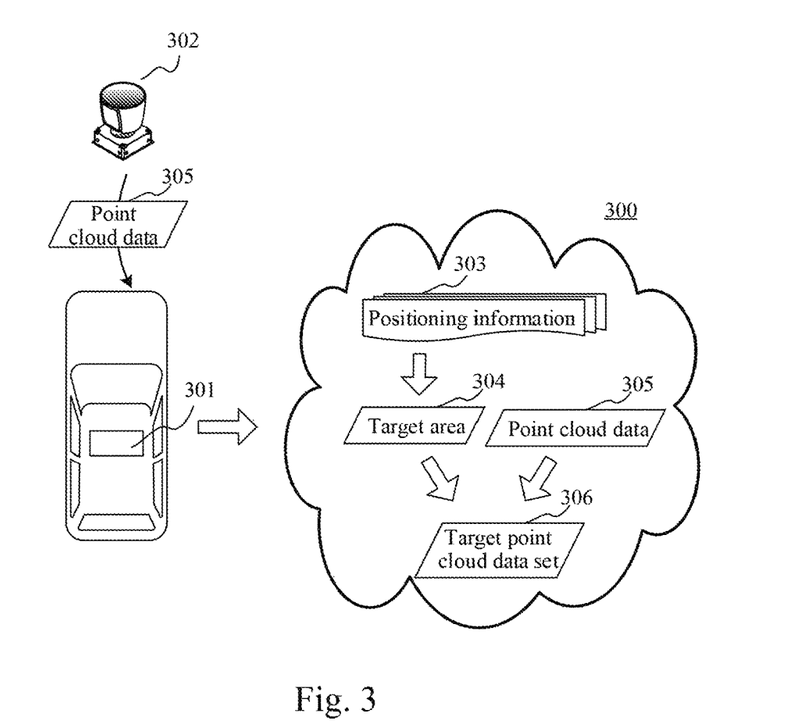
FIG. 3 is a schematic diagram of an application scenario of a method for outputting information of an autonomous vehicle according to the disclosure.

Further referring to FIG. 3. FIG. 3 is a schematic diagram of an application scenario of a method for outputting information of an autonomous vehicle according to the embodiment. In the application scenario of FIG. 3, positioning information 303 of the autonomous vehicle on which the vehicle terminal device 301 is implemented includes east longitude 40°27'6", and north latitude 116°38'3", and a vehicle terminal device 301 first determines that a target area 304 around the autonomous vehicle is a road area having a length of five meters and a width of ten meters in front of the vehicle from a high precision map stored in the terminal device, the road area adjoining the vehicle. Then, the vehicle terminal device 301 acquires obstacle point cloud data 305 in a square area of 20 m×20 m in front of the autonomous vehicle through a lidar 302. Then, if the target area 304 is a 2D polygon in a coordinate system of the autonomous vehicle, the point cloud data 305 is 3D coordinates of points in the coordinate system of the autonomous vehicle, and the vehicle terminal device 301 projects points indicated by the point cloud data 305 onto a plane of a 2D polygon formed by the target area 304. Point cloud data corresponding to projection points within the target area 304 among the projected points are determined as a point cloud data set corresponding to the target area 304, and the point cloud data set is determined as the target point cloud data set 306. Finally, the vehicle terminal device 301 outputs the target point cloud data set 306.

The method according to the above embodiments of the disclosure determines obstacle point cloud data in a perceived region of interest of the autonomous vehicle, and outputs the obstacle point cloud data, thereby reducing the usage rate of vehicle terminal processors, and improving the driving safety of the vehicle.

Figure 4:
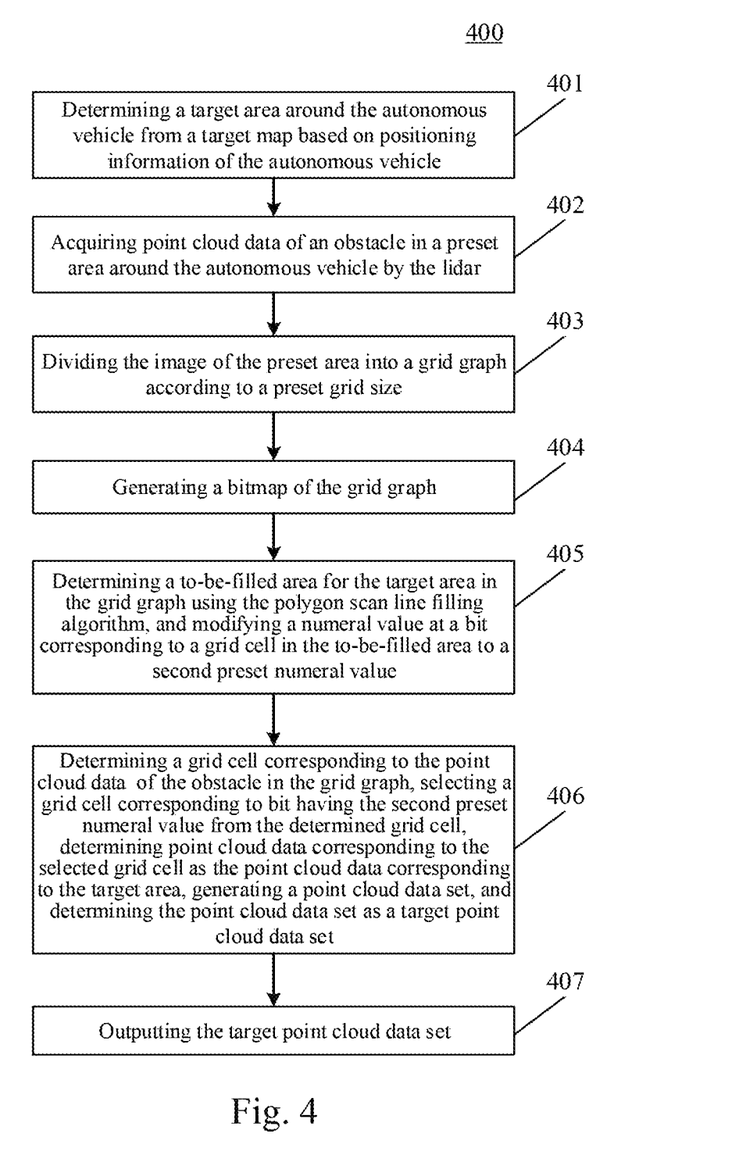
FIG. 4 is a flowchart of a method for outputting information of an autonomous vehicle according to another embodiment of the disclosure.

Further reference is made to FIG. 4, which shows a flow 400 of a method for outputting information of an autonomous vehicle according to another embodiment. The flow 400 of the method for outputting information of an autonomous vehicle includes steps 401 to 407.

Step 401 includes: determining a target area around the autonomous vehicle from a target map based on positioning information of the autonomous vehicle.

Step 402 includes: acquiring point cloud data of an obstacle in a preset area around the autonomous vehicle by the lidar.

In the embodiment, operations in the step 401 and the step 402 are basically identical to those in the step 201 and the step 202, and are not repeated any more here.

Step 403 includes: dividing the image of the preset area into a grid graph according to a preset grid size.

In the embodiment, the electronic device may first generate the image of the preset area, and then may divide the image of the preset area into a grid graph according to a preset grid size (e.g., side lengths of a grid cell: 0.1 m and 0.2 m). As an example, if the preset area is an area of 20 m×20 m, and a preset side length of the grid cell is 0.25 m, then the image may be divided into a grid graph of 80×80.

Step 404 includes: generating a bitmap of the grid graph.

In the embodiment, the electronic device may generate a bitmap of the grid graph, where each grid cell in the grid graph corresponds to one bit in the bitmap, and a numeral value at each bit of the bitmap is a preset first numeral value (e.g., 0). The bitmap may also be referred to as a bit mapping relation diagram. The bitmap marks, using a bit, a value corresponding to an element, and a key is the element. Storing data in a unit of bit may save storage space.

Step 405 includes determining a to-be-filled area for the target area in the grid graph using the polygon scan line filling algorithm, and modifying a numeral value at a bit corresponding to a grid cell in the to-be-filled area to a second preset numeral value.

In the embodiment, the electronic device may determine the to-be-filled area for the target area in the grid graph generated in the step 403 using the polygon scan line filling algorithm. Specifically, first, the electronic device may select a main direction in the grid area of the grid graph, and may set the y direction as the main direction, or determine the direction along which the polygon has a longer span from the x direction and the y direction as the main direction. Here, the way of selecting a main direction is not limited. To facilitate illustration, the y direction is set as the main direction, and the scanning direction of the scan lines is set as from bottom to top. Then, the electronic device determines a maximum value y_max and a minimum value y_min of each vertex of the polygon in the main direction, initially determines an intersection between a scan line y_min and the polygon, numbers the intersection points from left to right, and determines an area between an odd-numbered intersection point and an even-numbered intersection point as an inner area of the polygon. The inner area of the polygon is the to-be-filled area. Then, the electronic device determines an intersection between a scan line y_min+delta_y and the polygon, where delta_y is a size of the grid cell in the y direction, and further determines the inner area of the polygon, until completing scanning the polygon.

In the embodiment, the electronic device may further accelerate the polygon scan line filling process using an activated side list technology. When scan lines and sides of the polygon are processed to calculate intersections, because of the consistency of the sides, when a scan line $l_i$ intersects with a side of the polygon, an adjacent scan line $l_{i+1}$ of the scan line $l_i$ may also intersect with the side (unless the scan line goes beyond the interval of the side), and the intersection point between the scan line $l_{i+1}$ and the side may be calculated recursively from an intersection point between the last scan line $l_i$ and the side according to equation (2) below:

$$x_{i+1} = x_i + \frac{1}{k} \quad (2)$$

where $x_{i+1}$ is the intersection point between the scan line $l_{i+1}$ and the side, $x_i$ is the intersection point between the scan line $l_i$ and the side, k is a slope of the side, and i is a positive integer.

In this case, the side (a side intersecting with the scan line) is an activated side. Activated sides may be arranged in an ascending order of a minimum ordinate value of each of the activated sides. The arranged activated sides are stored in a linked list, which may be referred to as an activated side list. For each activated side, in the process of scanning the polygon using the scan lines, when a new position is scanned each time, it is necessary to determine whether scanning the activated side is completed, and if the scanning is completed, then it is necessary to delete the activated side from the activated side list. It is further necessary to determine whether the scan line scans a new side. If the new side is scanned, the scanned new side is added to the activated side list, and the activated sides in the activated side list are re-arranged.

In the embodiment, the electronic device may modify a numeral value at a bit corresponding to a grid cell in the to-be-filled area to a second preset numeral value (e.g., 1). Since the bitmap can simultaneously process a preset bit number (e.g., 32-bit or 64-bit) of bits, here numeral values at the bits of the preset bit number may be simultaneously modified to the second preset numeral values, thereby accelerating the scanning process.

Step 406 includes: determining a grid cell corresponding to the point cloud data of the obstacle in the grid graph, selecting a grid cell corresponding to bit having the second preset numeral value from the determined grid cell, determining point cloud data corresponding to the selected grid cell as the point cloud data corresponding to the target area, generating a point cloud data set, and determining the point cloud data set as a target point cloud data set.

In the embodiment, the electronic device may determine a grid cell corresponding to the point cloud data of the obstacle in the grid graph, select a grid cell corresponding to the bit having the second preset numeral value from the determined grid cell, then determine point cloud data corresponding to the selected grid cell as the point cloud data corresponding to the target area, generate a point cloud data set, and determine the point cloud data set as a target point cloud data set. Specifically, the electronic device may set coordinate values characterizing height information in the obstacle point cloud data as a height value of the target area, to determine a projection of the obstacle in the preset area. Each of points indicated by the point cloud data corresponds to one grid cell in the divided grid graph, and the one grid cell may correspond to a plurality of points. Then the electronic device may select the grid cell corresponding to the bit having the second preset numeral value from the determined grid cell, determine point cloud data corresponding to the selected grid cell as the point cloud data corresponding to the target area, generate a point cloud data set, and determine the point cloud data set as the target point cloud data set.

Step 407 includes: outputting the target point cloud data set.

In the embodiment, operations in the step 407 are basically identical to those in the step 204, and are not repeated any more here.

As can be seen from FIG. 4, compared with the embodiment corresponding to FIG. 2, the process 400 of the method for outputting information of an autonomous vehicle according to the embodiment highlights marking a grid in the to-be-filled data using a bit in the bitmap. Thus, the solution according to the embodiment can improve the scanning rate of scanning a polygon using scan lines, and further reduce the usage rate of vehicle terminal processors.

Figure 5:
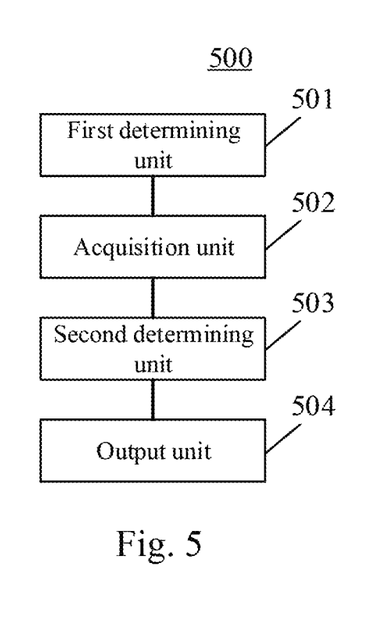
FIG. 5 is a structural schematic diagram of an apparatus for outputting information of an autonomous vehicle according to an embodiment of the disclosure.

Further referring to FIG. 5, as an implementation of the method shown in the above figures, the disclosure provides an embodiment of an apparatus for outputting information of an autonomous vehicle. The embodiment of the apparatus corresponds to the embodiment of the method shown in FIG. 2. The apparatus may be specifically applied to a variety of electronic devices.

As shown in FIG. 5, the apparatus 500 for outputting information of an autonomous vehicle according to the embodiment includes: a first determining unit 501, an acquisition unit 502, a second determining unit 503, and an output unit 504. The first determining unit 501 is configured for determining a target area around the autonomous vehicle from a target map based on positioning information of the autonomous vehicle; the acquisition unit 502 is configured for acquiring point cloud data of an obstacle in a preset area around the autonomous vehicle by the lidar, the preset area including the target area; the second determining unit 503 is configured for determining a point cloud data set corresponding to the target area from the point cloud data of the obstacle based on the target area and the point cloud data, and determining the point cloud data set as the target point cloud data set; and the output unit 504 is configured for outputting the target point cloud data set.

Specific processing of the first determining unit 501, the acquisition unit 502, the second determining unit 503, and the output unit 504 of the apparatus 500 for outputting information of an autonomous vehicle according to the embodiment and technical effects brought thereby may be referred to the steps 201, 202, 203 and 204 in the embodiment corresponding to FIG. 2.

In some optional implementations of the embodiment, the target area may be a 2D polygon in the world coordinate system. The world coordinate system is a systematic absolute coordinate system, and respective positions of coordinates of all points on the image are determined based on the origin of the world coordinate system prior to establishing a user coordinate system. The apparatus 500 for outputting information of an autonomous vehicle may further include a conversion unit (not shown in the figure). After acquiring the point cloud data of the obstacle in the preset area, the conversion unit needs to convert the point cloud data from the local coordinate system into the world coordinate system, where the local coordinate system is a coordinate system with the midpoint of the lidar as the origin of coordinates. The coordinate conversion from the local coordinate system to the world coordinate system is well-known knowledge that is widely researched and applied at present, and is not repeated any more here.

In some optional implementations of the embodiment, the second determining unit 503 may include a filling module (not shown in the figure) and a first generation module (not shown in the figure). The filling module may fill the target area in an image of the preset area using a polygon scan line filling algorithm. Specifically, first, the filling module may set the y axis direction in the coordinate system as the main direction, or determine the direction in which the polygon has a longer span from the x axis direction and the y axis direction as the main direction. Here, the way of selecting the main direction is not limited. To facilitate illustration, the y axis direction is set as the main direction, and the scanning direction of the scan lines is set as from bottom to top. Then, the scan lines begin to scan the polygon formed by the target area. The intersection points between the scan lines and the polygon may be recorded during each scanning, and be numbered from left to right. Then, an area between an odd-numbered intersection point and an even-numbered intersection point is determined as an inner area of the polygon. Finally, the position of the scan line is updated based on a constant scanning interval, until completing scanning the polygon.

In some optional implementations of the embodiment, after filling the target area, the first generation module may determine a position corresponding to the point cloud data of the obstacle in the preset area, determine point cloud data corresponding to a filled position as the point cloud data corresponding to the target area, and finally generate a point cloud data set. Specifically, the first generation module may set coordinate values characterizing height information in the point cloud data of the obstacle as a height value of the target area, to determine a projection of the obstacle on the preset area. Each of points indicated by the point cloud data corresponds to one position in the preset area, and the one position may correspond to a plurality of points. Then the first generation module may determine point cloud data of the point corresponding to the filled position as the point cloud data corresponding to the target area, and generate the point cloud data set.

In some optional implementations of the embodiment, the second determining unit 503 may further include a division module (not shown in the figure), a second generation module (not shown in the figure), a modification module (not shown in the figure), and a determining module (not shown in the figure). The division module may first generate an image of the preset area, and then may divide the image of the preset area into a grid graph according to a preset grid size. The second generation module may generate a bitmap of the grid graph, where each grid cell in the grid graph corresponds to one bit in the bitmap, and a numeral value at each bit of the bitmap is a preset first numeral value. The bitmap may also be referred to as a bit mapping relation diagram. The bitmap, using a bit, marks a value corresponding to an element, while a key is the element. Storing data in a unit of bit can save storage space.

In some optional implementations of the embodiment, the modification module may determine a to-be-filled area for the target area in the generated grid graph using the polygon scan line filling algorithm. Specifically, first, the modification module may select a main direction in the grid area of the grid graph, and may set the y direction as the main direction, or determine the direction in which the polygon has a longer span from the x direction and the y direction as the main direction. Here, the way of selecting the main direction is not limited. To facilitate illustration, the y direction is set as the main direction, and the scanning direction of the scan lines is set as from bottom to top. Then, the electronic device determines a maximum value y_max and a minimum value y_min of vertexes of the polygon in the main direction, first determines intersections between a scan line y_min and the polygon, numbers the intersection points from left to right, and determines an area between an odd-numbered intersection point and an even-numbered intersection point as an inner area of the polygon. The inner area of the polygon is the to-be-filled area. Then, the electronic device determines an intersection between a scan line y_min+delta_y and the polygon, where delta_y is a size of a grid grid divided in the y direction, and further determines the inner area of the polygon, until completing scanning the polygon.

In some optional implementations of the embodiment, the determining module may determine a grid cell corresponding to the point cloud data of the obstacle in the grid graph, select a grid cell corresponding to the bit having the second preset numeral value from the determined grid cell, then determine point cloud data corresponding to the selected grid cell as the point cloud data corresponding to the target area, generate a point cloud data set, and determine the point cloud data set as a target point cloud data set. Specifically, the determining module may set coordinate values characterizing height information in the obstacle point cloud data as a height value of the target area, to determine a projection of the obstacle in the preset area. Each of points indicated by the point cloud data corresponds to one grid cell in the divided grid graph, and the one grid cell may correspond to a plurality of points. Then the determining module may select the a grid cell corresponding to the bit having the second preset numeral value from the determined grid cell, determine point cloud data corresponding to the selected grid cell as the point cloud data of the obstacle in the target area, generate a point cloud data set, and determine the point cloud data set as the target point cloud data set.

In some optional implementations of the embodiment, it is generally necessary to determine a number of intersection points between each vertex of the polygon and the scan lines. The filling module may determine, for each vertex of the polygon formed by the target area an intersection point as follows: first, the filling module may acquire abscissa values and ordinate values of a first vertex and a second vertex in response to determining a scan line $l_i$ n parallel with an abscissa axis scanning the vertex, where the first vertex and the second vertex are vertexes adjacent to the scanned vertex among vertexes of the polygon, and the vertex adjacent to the scanned vertex is a vertex sharing a side with the scanned vertex, i.e., the scanned vertex and the vertex adjacent thereto are two endpoints of a side of the polygon; then may determine a value of difference between an ordinate value of an endpoint having a smaller abscissa value among the first vertex and the second vertex and an ordinate value of the scanned vertex as a first difference value; then may determine a value of difference between an ordinate value of an endpoint having a greater abscissa value among the first vertex and the second vertex and an ordinate value of the scanned vertex as a second difference value; and finally determine whether a product of the first difference value and the second difference value is greater than zero, and determine the number of intersection points between the scanned vertex and the scan line as two if the product of the first difference value and the second difference value is greater than zero.

Figure 6:
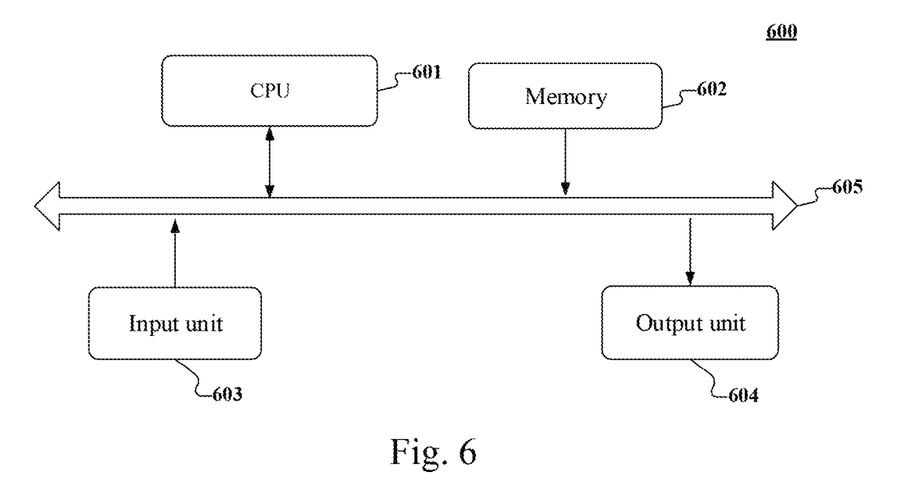
FIG. 6 is a structural schematic diagram of a computer system adapted to implement an electronic device according to an embodiment of the disclosure.

Reference is made to FIG. 6, which shows a structural schematic diagram of of a computer system 600 adapted to implement an electronic device according to an embodiment of the disclosure. The electronic device shown in FIG. 6 is only an example, and should not limit the functions and scope of the embodiments of the disclosure in any way.

As shown in FIG. 6, the electronic device 600 includes a central processing unit (CPU) 601, a memory 602, an input unit 603, and an output unit 604, where the CPU 601, the memory 602, the input unit 603, and the output unit 604 are connected to each other through a bus 605. Here, the method according to an embodiment of the disclosure may be implemented as a computer program, and be stored in the memory 602. The CPU 601 of the electronic device 600 specifically implements an information output function defined in the method according to the embodiment of the disclosure by invoking the computer program stored in the memory 602. In some implementations, the input unit 603 may be a device that may be used for acquiring point cloud data, such as a lidar, and the output unit 604 may be a device that may be used for a 3D image of an obstacle in the target area, such as a display. Therefore, when invoking the computer program to execute an information output function, the CPU 601 may control the input unit 603 to acquire obstacle point cloud data from outside, and control the output unit 604 to display a 3D image of the obstacle.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including first determining unit, an acquisition unit, a second determining unit and an outputting unit, where the names of these units do not in some cases constitute a limitation to such units themselves. For example, the outputting unit may also be described as "a unit for outputting a target point cloud data set.

In another aspect, the present disclosure further provides a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: determining a target area around the autonomous vehicle from a target map based on positioning information of the autonomous vehicle; acquiring point cloud data of an obstacle in a preset area around the autonomous vehicle by the lidar, the preset area including the target area; determining a point cloud data set corresponding to the target area from the point cloud data of the obstacle based on the target area and the point cloud data, and determining the point cloud data set as a target point cloud data set; and outputting the target point cloud data set.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A computer implemented method for outputting information of obstacles in a target area of interest of an autonomous vehicle, the autonomous vehicle comprising a lidar, and the method comprising executing, on a processor, the following steps:

determining the target area around the autonomous vehicle from a target map based on positioning information of the autonomous vehicle;

receiving point cloud data of an obstacle in a preset area around the autonomous vehicle from the lidar, the preset area including the target area;

determining a point cloud data set corresponding to the target area from the point cloud data of the obstacle by projecting the point cloud data onto a plane of the target area, and determining the point cloud data set as a target point cloud data set; and outputting the target point cloud data set to a cloud server for updating the information of obstacles.

2. The method according to claim 1, wherein the target area is a two dimension polygon in a world coordinate system; and after the acquiring point cloud data of an obstacle around the autonomous vehicle, the method further comprises:

converting the point cloud data from a local coordinate system into the world coordinate system, wherein the local coordinate system is a coordinate system with a midpoint of the lidar as an origin of coordinates.

3. The method according to claim 1, wherein the determining a point cloud data set corresponding to the target area from the point cloud data of the obstacle comprises:

filling the target area in an image of the preset area using a polygon scan line filling algorithm; and determining a position corresponding to the point cloud data of the obstacle in the preset area, determining point cloud data corresponding to a filled position as point cloud data corresponding to the target area, and generating the point cloud data set.

4. The method according to claim 3, wherein the filling the target area in an image of the preset area using a polygon scan line filling algorithm comprises:

determining, for each vertex of a polygon formed by the target area, an intersection by: acquiring abscissa values and ordinate values of a first vertex and a second vertex in response to determining that a scan line in parallel with an abscissa axis scans the each vertex, wherein the first vertex and the second vertex are vertexes adjacent to the each vertex among vertexes of the polygon; determining a value of difference between an ordinate value of a vertex having a smaller abscissa value among the first vertex and the second vertex and an ordinate value of the each vertex as a first difference value; determining a value of difference between an ordinate value of a vertex having a greater abscissa value among the first vertex and the second vertex and an ordinate value of the each vertex as a second difference value; and determining a number of intersection points between the each vertex and the scan line as two in response to determining a product of the first difference value and the second difference value being greater than zero.

5. The method according to claim 1, wherein the determining a point cloud data set corresponding to the target area from the point cloud data of the obstacle comprises:

dividing the image of the preset area into a grid graph according to a preset grid size;

generating a bitmap of the grid graph, wherein each grid cell in the grid graph corresponds to one bit in the bitmap, and a numeral value at each bit of the bitmap is a preset first numeral value;

determining a to-be-filled area for the target area in the grid graph using the polygon scan line filling algorithm, and modifying a numeral value at a bit corresponding to a grid cell in the to-be-filled area to a second preset numeral value; and determining a grid cell corresponding to the point cloud data of the obstacle in the grid graph, selecting a grid cell corresponding to a bit having the second preset numeral value from the determined grid cell, and determining point cloud data corresponding to the selected grid cell as the point cloud data corresponding to the target area.

6. An apparatus for outputting information of obstacles in a target area of interest of an autonomous vehicle, the autonomous vehicle comprising a lidar, the apparatus comprising:

at least one processor; and a memory storing instructions, the instructions when executed by the at least one processor, cause the at least one processor to perform operations, the operations comprising:

determining the target area around the autonomous vehicle from a target map based on positioning information of the autonomous vehicle;

receiving point cloud data of an obstacle in a preset area around the autonomous vehicle from the lidar, the preset area including the target area;

determining a point cloud data set corresponding to the target area from the point cloud data of the obstacle by projecting the point cloud data onto a plane of the target area, and determining the point cloud data set as a target point cloud data set; and outputting the target point cloud data set to a cloud server for updating the information of obstacles.

7. The apparatus according to claim 6, wherein the target area is a 2D polygon in a world coordinate system; and after the acquiring point cloud data of an obstacle around the autonomous vehicle, the operations further comprise:

converting the point cloud data from a local coordinate system into the world coordinate system, wherein the local coordinate system is a coordinate system with a midpoint of the lidar as an origin of coordinates.

8. The apparatus according to claim 6, wherein the determining a point cloud data set corresponding to the target area from the point cloud data of the obstacle comprises:

filling the target area in an image of the preset area using a polygon scan line filling algorithm; and determining a position corresponding to the point cloud data of the obstacle in the preset area, determining point cloud data corresponding to a filled position as the point cloud data corresponding to the target area, and generating the point cloud data set.

9. The apparatus according to claim 8, wherein the filling the target area in an image of the preset area using a polygon scan line filling algorithm comprises:

determining, for each vertex of a polygon formed by the target area, an intersection by: acquiring abscissa values and ordinate values of a first vertex and a second vertex in response to determining that a scan line in parallel with an abscissa axis scans the each vertex, wherein the first vertex and the second vertex are vertexes adjacent to the each vertex among vertexes of the polygon; determining a value of difference between an ordinate value of a vertex having a smaller abscissa value among the first vertex and the second vertex and an ordinate value of the each vertex as a first difference value; determining a value of difference between an ordinate value of a vertex having a greater abscissa value among the first vertex and the second vertex and an ordinate value of the each vertex as a second difference value; and determining a number of intersection points between the each vertex and the scan line as two in response to determining a product of the first difference value and the second difference value being greater than zero.

10. The apparatus according to claim 6, wherein the determining a point cloud data set corresponding to the target area from the point cloud data of the obstacle comprises:
dividing the image of the preset area into a grid graph according to a preset grid size;
generating a bitmap of the grid graph, wherein each grid cell in the grid graph corresponds to one bit in the bitmap, and a numeral value at each bit of the bitmap is a preset first numeral value;
determining a to-be-filled area for the target area in the grid graph using the polygon scan line filling algorithm, and modifying a numeral value at a bit corresponding to a grid cell in the to-be-filled area to a second preset numeral value; and
determining a grid cell corresponding to the point cloud data of the obstacle in the grid graph, selecting a grid cell corresponding to a bit having the second preset numeral value from the determined grid cell, and determining point cloud data corresponding to the selected grid cell as the point cloud data corresponding to the target area.

11. A non-transitory computer storage medium, storing a computer program, the program, when executed by a processor, causes the processor to perform operations, the operations comprising:
determining a target area around an autonomous vehicle from a target map based on positioning information of the autonomous vehicle;
receiving point cloud data of an obstacle in a preset area around the autonomous vehicle from the lidar, the preset area including the target area;
determining a point cloud data set corresponding to the target area from the point cloud data of the obstacle by projecting the point cloud data onto a plane of the target area, and determining the point cloud data set as a target point cloud data set; and
outputting the target point cloud data set to a cloud server for updating the information of obstacles.

* * * * *